United States Patent [19]
Rosén

[11] Patent Number: 5,004,327
[45] Date of Patent: Apr. 2, 1991

[54] LIGHT-POLARIZING MATERIAL IN THE FORM OF SHEETS OR OF A WEB AND A METHOD FOR THE MANUFACTURE OF THE MATERIAL

[75] Inventor: Ake Rosén, Ulvögatan, Sweden

[73] Assignee: Svecia Antiqua Limited, Kent, England

[21] Appl. No.: 277,703

[22] Filed: Nov. 30, 1988

[30] Foreign Application Priority Data

Dec. 1, 1987 [SE] Sweden .............................. 8704791

[51] Int. Cl.5 .......................... G02B 1/08; G02B 5/30
[52] U.S. Cl. .................................. 350/398; 252/585; 283/89; 283/90; 283/106; 350/397
[58] Field of Search ...................... 350/396, 397, 398; 283/88, 89, 90, 93, 106, 107; 252/585; 264/1.3

[56] References Cited

U.S. PATENT DOCUMENTS

| Re. 23,297 | 11/1950 | Hyman, Jr. et al. | 350/398 |
|---|---|---|---|
| 2,286,569 | 6/1942 | Pollack | 350/397 |
| 2,306,108 | 12/1942 | Land et al. | 350/398 |
| 2,330,718 | 9/1943 | Kallman | 283/89 |
| 2,356,252 | 8/1944 | Land | 350/397 |
| 2,402,166 | 6/1946 | Land | 350/397 |
| 2,416,510 | 2/1947 | Binda | 350/396 |
| 2,423,503 | 7/1947 | Land et al. | 350/396 |
| 3,307,945 | 3/1967 | Mahler | 350/396 |
| 3,313,052 | 4/1967 | Malster | 350/396 |
| 3,391,479 | 7/1968 | Buzzell et al. | 350/396 |
| 3,868,293 | 2/1975 | Selph | 350/397 |
| 4,388,375 | 6/1983 | Hopper et al. | |
| 4,659,523 | 4/1987 | Rogers et al. | |

FOREIGN PATENT DOCUMENTS

| 3026614 | 2/1981 | Fed. Rep. of Germany | |
|---|---|---|---|
| 59-176708 | 10/1984 | Japan | 350/398 |
| 59-176709 | 10/1984 | Japan | 350/398 |
| 60-66205 | 4/1985 | Japan | 350/398 |
| 2204532 | 11/1988 | United Kingdom | 283/106 |

*Primary Examiner*—Bruce Y. Arnold
*Assistant Examiner*—Martin Lerner
*Attorney, Agent, or Firm*—Burns, Doane, Swecker & Mathis

[57] ABSTRACT

A light-polarizing element for use in a security document to permit authentication of the security document includes an intermediate layer of water-absorbing polymer material laminated between two outer layers of transparent material. The intermediate layer contains polarizing crystals that are absorbed in the intermediate layer and that are oriented in a predetermined direction through mechanical stretching. The two outer layers are sealed to one another in a liquid-tight manner along their longitudinal edges.

3 Claims, 2 Drawing Sheets

LIGHT-POLARIZING MATERIAL IN THE FORM OF SHEETS OR OF A WEB AND A METHOD FOR THE MANUFACTURE OF THE MATERIAL

FIELD OF THE INVENTION

The present invention relates to a light-polarizing material in the form of sheets or a web comprising polarizing crystals oriented in a preferred direction. The invention also relates to a method for the manufacture of the material, and the utilization of the material in special documents or securities such as bank-notes, shares, identity cards, passports etc. for checking the legitimacy/authenticity of the respective document or security.

BACKGROUND OF THE INVENTION

It is known that securities, identity documents, special papers etc. can be provided with markings of the type which normally are invisible, but which can be made visible with the help of external ancillary devices. The object of these markings is, of course, to render more difficult any improper reproduction or forgery of the documents. At the same time, such markings serve with the help of which it to make it easy to detect whether a certain document is authentic or forged. It is known, for example, that identity documents and other documents can be provided with a marking of legitimacy or authenticity with a phosphorizing color or material, where the phosphorizing material can be made visible after irradiation by ultraviolet light. In such a manner, any kind of texts and markings, numerical series, names etc. can be introduced. That method though is not entirely desirable because in order to check the marking of legitimacy therefor special ancillary devices are required to make the markings readable, and it is necessary, therefore to have recourse to such a device for a check of legitimacy. It is also known that certain parts of a document can be magnetized and thus be provided with a code of legitimacy produced by magnetic means. In that case too, access to a relatively complicated apparatus is required in order to detect the presence and significance of the magnetic markings. A simpler check of legitimacy or authenticity is made possible, though, if the markings are brought about with the help of sheetlike or striplike polarizing materials. These polarizing materials may be laminated, for example, between outer layers of a material making up the document or the security capable of normally being written or printed on, e.g. paper, and be freely through holes situated oppositely in pairs in the outer layers on both sides of the document. The checking of such a document is done quite simply in that a corresponding outer strip or sheet of the polarizing material is placed against one side of the document over the area of the holes, whereupon the area covered is inspected visually against the light background. By turning the outer strip in such a way that its axis of polarization forms a right angle with the axis of polarization of the covered material of the document, the marking of legitimacy or authenticity is made visible in the form of a dark spot within the area of the hole inspected owing to extinction of the light. Such a check is easy to perform and does not require any complicated, expensive ancillary equipment. An even simpler check is made possible, however, if the polarizing material in the document is freely exposed within at least two hole areas which are so designed and placed in relation to one another that they can be made to overlap one another at least partially by means of simple folding of the document in such a manner that the respective axes of polarization of the strips, made to overlap by folding, intersect one another at a right angle. In this case, a separate outer polarizing checking strip is not required, but is replaced by the strip already present in the document.

To facilitate the handling of a document or a security of the type described here, the document or security must be very thin. Also, in order to avoid unnecessarily increasing the material thickness of the document the polarizing material strip used has to be made very thin over a corresponding length. A method suggested previously for the manufacture of such a thin, polarizing material is based on the extrusion in a known manner of a mixture of plastics and admixed polarizing crystals, e.g. herapathite, through a narrow sheet die and then stretching the extruded film for orientation of the said crystals in a preferred direction coinciding with the direction of stretching. The method works unsatisfactorily in practice, however, and it has been found difficult in particular to achieve a homogeneous admixture or dispersion of the crystals added to the extrusion mass, which is necessary so that the finished film should have uniform light quality properties.

SUMMARY AND OBJECTS OF THE INVENTION

The present invention provides a method for the manufacture of a light-polarizing material in the form of sheets or a web which can be used advantageously in documents or securities which are easy to check but difficult to forge. It has been found in accordance with the present invention that such a light-polarizing material, either in the form of sheets or a web, with the desired uniform light quality properties can be readily manufactured by introducing the polarizing crystals by means of absorption followed by mechanical stretching of the film for orientation of the crystals. This is made possible in accordance with the present invention in that as a starting material, a substantially dry film of water-absorbing polymer is used which is moistened or brought into contact with an aqueous solution containing polarizing crystals which during the absorption of water by the film migrate into, and distribute themselves homogeneously in the film, whereafter the film is stretched for orientation of the absorbed crystals in a preferred direction coinciding with the direction of stretching, preferably the longitudinal direction of the film.

The invention will be described hereinafter in more detail with reference to the enclosed drawings, wherein

DETAILED DESCRIPTION OF THE PREFERRED EMBODIMENTS

Figure 1:
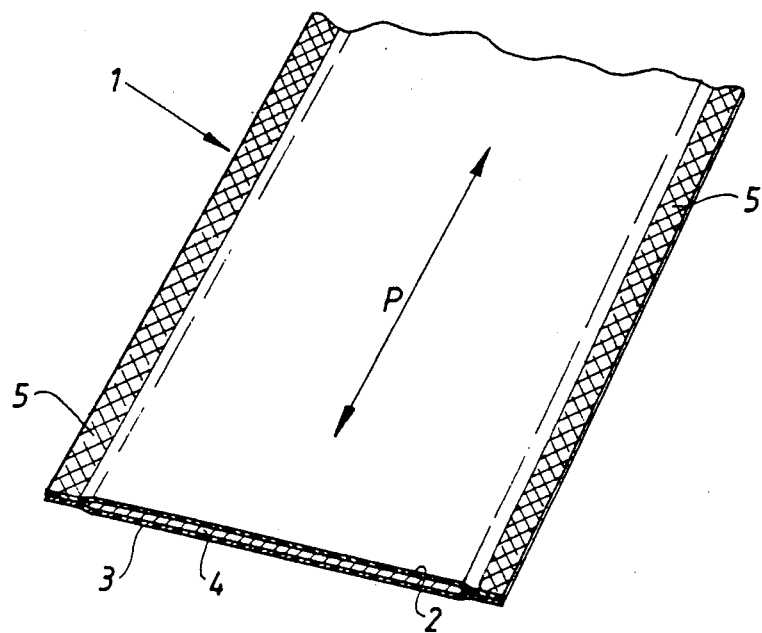
FIG. 1 is a schematic view of a portion of a weblike material in accordance with the invention.

The weblike polarizing material in accordance with the present invention with the general reference marking 1 shown in FIG. 1 comprises an upper and a lower transparent plastic layer, e.g. polyamide or some other suitable thermoplastics, 2 and 3 respectively, and a layer 4 of water-absorbing polymeric material, e.g. polyvinyl alcohol laminated between these layers. The intermediate layer 4 contains polarizing crystals, e.g. iodine crystals, absorbed in the layer, which by means of mechanical stretching of the polymer layer 4 have been oriented in a preferred direction which in the embodiment shown here coincides with the longitudinal direction of the material 1, as indicated by the double-headed arrow P. As is evident from FIG. 1, the two outer layers 2 and 3 preferably are wider than the intermediate layer 4 and are connected to one another by means of water-tight seals enclosing the intermediate layer 4 along axial edge zones 5 of the material.

The two outer layers 2 and 3, which preferably have been applied by extrusion, render the material liquid-tight and prevent above all any loss of the water in the intermediate layer 4, which is required for maintaining the polarizing characteristics of the material. To protect the intermediate layer 4 against chemical reactions detrimental to the quality which may be initiated if the intermediate layer 4 is exposed to UV-radiation, the two outer layers 2 and 3 preferably include so-called UV-adsorbents, e.g. amines, which effectively absorb the reaction-initiating energy from such radiations, and consequently protect the intermediate sensitive layer 4.

Figure 2:
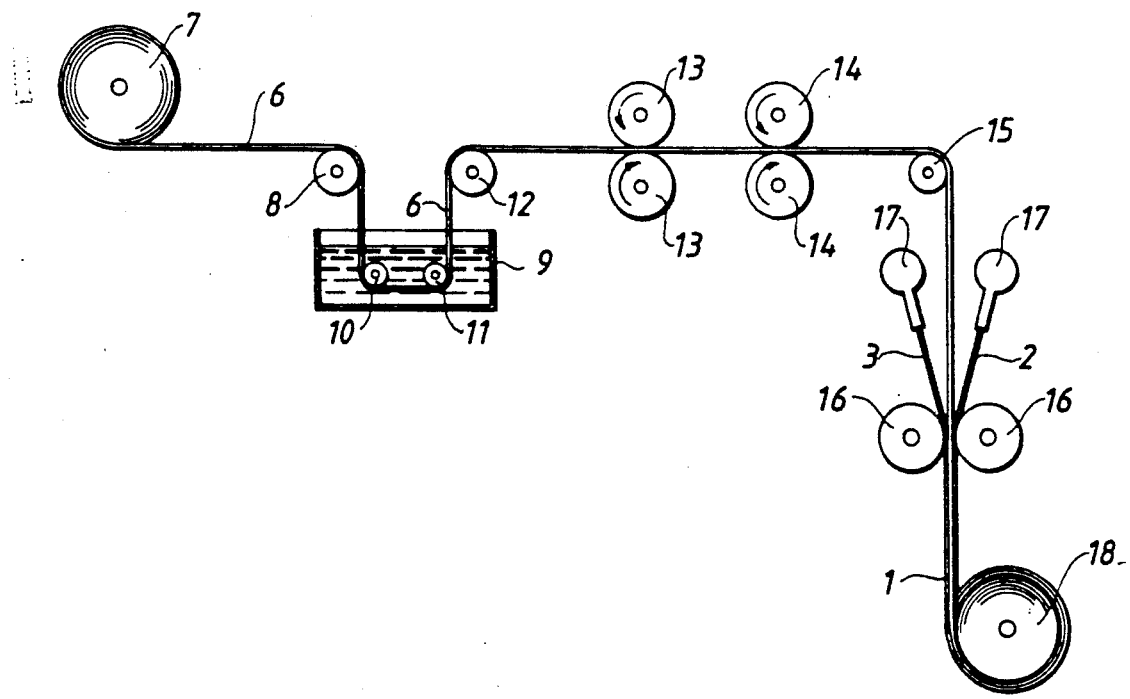
FIG. 2 is a schematic diagram illustrating one method for manufacturing the web material according to the present invention.

The material 1 in accordance with the invention can be manufactured by the method as illustrated in FIG. 2. In accordance with this method the material is manufactured in that a substantially dry web 6 of water-absorbing polymer, e.g. polyvinyl alcohol, which has been manufactured previously is rolled off a magazine roll 7 and is led via a deflection roller 8 down into a tank 9 comprising an aqueous solution of polarizing crystals, e.g. iodine. The rollers 10 and 11 help to facilitate and to ensure that during its passage through the tank 9 the whole web is duly immersed in the aqueous solution. During the passage, the web 6 absorbs water and accompanying polarizing crystals which migrate into, and distribute themselves uniformly in, the web material. The moistened web 6 containing crystals is conducted from the tank 9 via a deflection roller 12 between a first pair of cylinders 13 pressed against one another and driven slip-free by the passing web, and thereafter between a second pair of cylinders 14 pressed against one another and driven separately in the direction of movement of the web. The cylinders 14 are driven at a speed of rotation which is greater than the coresponding speed of the web and consequently of the cylinders 13, as a result of which the web is thus subjected to a mechanical stretching in the region between the two pairs of cylinders. This means on the one hand that the crystals absorbed in the web 4 are oriented in a preferred direction corresponding to the direction of stretching and on the other hand that the web 6 is somewhat thinned down, which is desirable. After this stretching and orientation, the web is conducted via a deflection roller 15 to and between revolving cooling cylinders 16. During the passage between the cylinders 16, the web 6 is laminated between outer films 2 and 3. The outer films 2, 3 are extruded from extruders 17 arranged on either side of the web and directed towards the nip of the cylinders. Thereafter the finished polarizing material (which is now designated 1) is wound onto a magazine roll 18.

Figure 3:
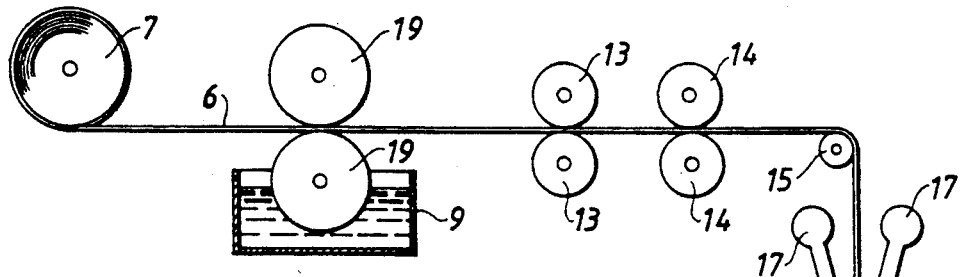
FIG. 3 is a schematic diagram illustrating another method for manufacturing the web material according to the present invention.

FIG. 3 illustrates a further method of manufacturing the material in accordance with the present invention. The method shown here corresponds in many respects to the method described earlier, and for the sake of clarity, therefore, the same reference markings have been used for corresponding components. The method in accordance with FIG. 3 in principle differs from the earlier one only in the manner in which the web 6 is brought into contact with the aqueous solution for the absorption of the polarizing crystals. In this example, the web 6 rolled off the magazine roll 7 is conducted between slip-free revolving cylinders 19 whereof the one of the rollers, or lower roller, rotates partially immersed in the aqueous solution in order to take up a film which follows the circumferential surface of the cylinder. The web 6 is pressed against the film under light pressure by the second, or upper, cylinder 19 during the passage through the nip of the cylinders in order to take up the water and the accompanying polarizing crystals. Compared with the previously described, this method, among other things, has the advantage that the dry web 6 does not have to be conducted over any deflection roller, which in the case of particularly brittle or thin material may entail a danger of a break in the web or of material cracks caused by external stresses resulting from the deflection rollers.

In accordance with the present invention, a polarizing polyvinyl alcohol strip have a final thickness of approx. 15 $\mu$m is produced by first moistening one side of the dry original strip with an aqueous solution containing polarizing iodine crystals in a quantity of 5%, calculated on the total weight of the solution, during a contact time of approx. 3 seconds. Thereafter the strip so moistened is subjected to a stretching operation during which the strip is stretched axially to approximately 5 times its length. The finished strip contains approx. 2% iodine and approx. 38% water, based on the total weight of the polyvinyl alcohol strip.

The percentage figures and process parameters indicated above have proved particularly advantageous if the original strip used is constituted of polyvinyl alcohol, but polarizing material in sheet or web form functioning satisfactorily can be obtained more generally with material containing between 1 and 4% iodine and between 39 and 37% water. The stretching of the web, which in the preferred example amounts to 5 times the length of the original web, likewise may vary between 2 and 8 times the initial length.

A couple of examples will now be described with reference to FIGS. 4–7 concerning the utilization of the striplike material in accordance with the present invention in so-called security documents.

Figure 4:
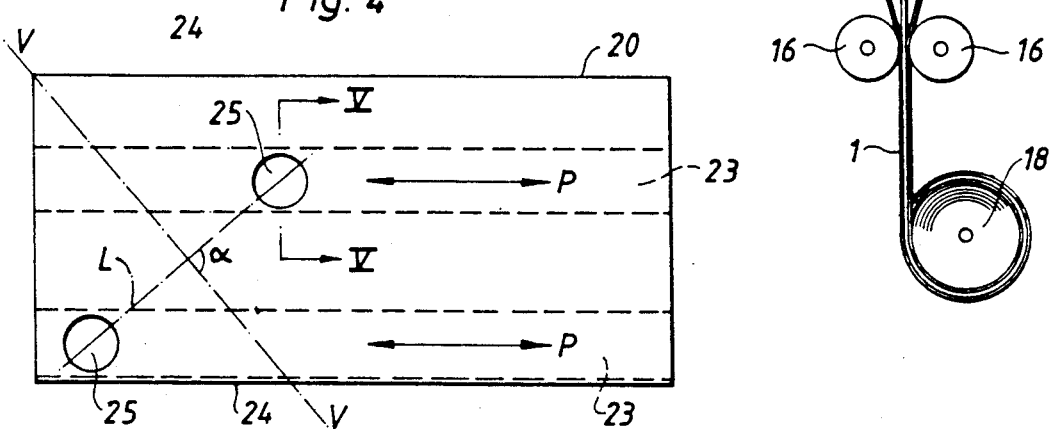
FIG. 4 is a top view of a security article incorporating the weblike material according to the present invention.
Figure 5:
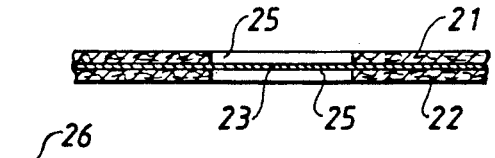
FIG. 5 is a cross-sectional view along the line 5—5 in FIG. 4.

FIGS. 4 and 5 show an example of how a striplike polarizing material in accordance with the present invention may be used in a security document 20, e.g. a bank-note. The document 20, as is evident from FIG. 5, is made up of outer layers 21 and 22 of material capable of normally being written or printed on, e.g. paper, laminated to one another and of strips 23 of the polarizing material in accordance with the present invention laminated between the paper layers. The strips 23 in the present example have an axis of polarization which runs parallel with the longitudinal edges 24 of the document 20 and are adapted, moreover, so that they wholly cover, and are freely exposed through holes 25 provided in the paper layer of the document. The holes 25 are arranged so that by simply folding the document along a folding line V—V the holes can be made to at least partially overlap one another. Furthermore, the holes 25 are placed so that the strip portions exposed through the holes, have axes of polarization which intersect one another at a right angle when the document is folded. In the present case this is achieved in that the document 20 is folded along a folding line V—V which intersects a line L connecting central points of the holes 25 at an angle $\alpha$ which should be equal to 90°. In a check of the authenticity or legitimacy of the document 20 by the aforementioned folding process, a dark (black) spot appears within the area of the exposed overlapping strip portions when the folded document 20 is inspected visually against light background.

Figure 6:
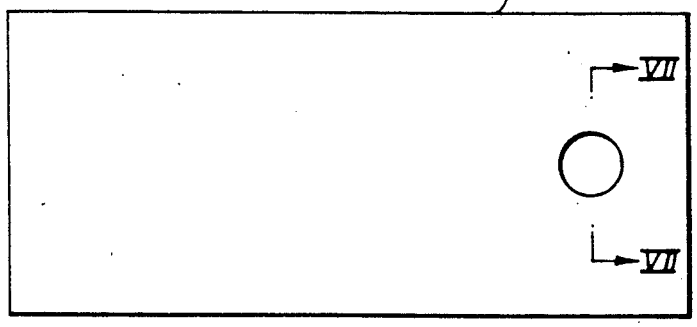
FIG. 6 is a top view of a security article incorporating the weblike material according to the present invention in a manner different from FIG. 4.
Figure 7:
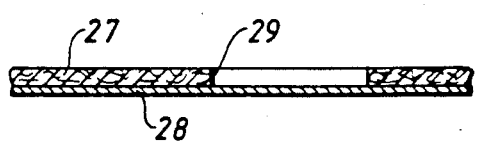
FIG. 7 is a cross-sectional view along the line 7—7 in FIG. 6.

FIGS. 6 and 7 show a further example of how a strip-like polarizing material in accordance with the invention can be used for checking the authenticity or legitimacy of a special document 26. The document 26 in the present example comprises only one layer 27 of material capable of normally being written or printed on, e.g. paper, and a striplike material 28 in accordance with the present invention applied to one side of the paper layer. The material 28 is adapted to cover one hole 29 provided in the layer 27, and the checking of such a document 26 here takes place so that a separate external, polarizing strip of the same type as the strip 28 is applied to the other side of the document 26 over the hole 29 and is turned so that its axis of polarization forms a right angle with the axis of polarization of the strip 28 which, for example, may be oriented parallel with the longitudinal edges of the document. When the document thereafter is inspected visually through the hole 29 against light background, a dark (black) spot appears as a sign of the authenticity and/or legitimacy of the document within the area of the inspected hole, owing to total extinction of transmitted light.

While this invention has been illustrated and described in accordance with a preferred embodiment, it is recognized that variations and changes may be made and equivalents employed herein without departing from the invention as set forth in the claims.

What is claimed is:

1. A light-polarizing element for use in a security document to permit authentication of the security document, comprising:

a layer of water-absorbing polymer material that contains polarizing crystals, said polarizing crystals being absorbed in the water-absorbing polymer material and being oriented in a predetermined direction by mechanical stretching of the water-absorbing polymer layer, said layer of water-absorbing polymer material being manufactured from polyvinyl alcohol and containing between about 1% and 4% iodine and between about 37% and 39% water, wherein the percentages are based on the total weight of the polymer, said polarizing crystals being water-soluble iodine crystals; and two outer transparent layers of thermoplastic material, said layer of water-absorbing polymer material being laminated between said two outer transparent layers with edge zones of one of said two outer transparent layer being sealed to edge zones of the outer of said two outer transparent layers in a liquid-tight manner.

2. The light-polarizing element according to claim 1, wherein said two outer layers include ultraviolet light adsorbents.

3. The light-polarizing element of claim 1, wherein said two outer layers of thermoplastic material are extruded.

* * * * *